No. 760,731. PATENTED MAY 24, 1904.
W. CLEELAND.
SHOE ATTACHMENT FOR VEHICLE WHEELS.
APPLICATION FILED FEB. 19, 1904.
NO MODEL.
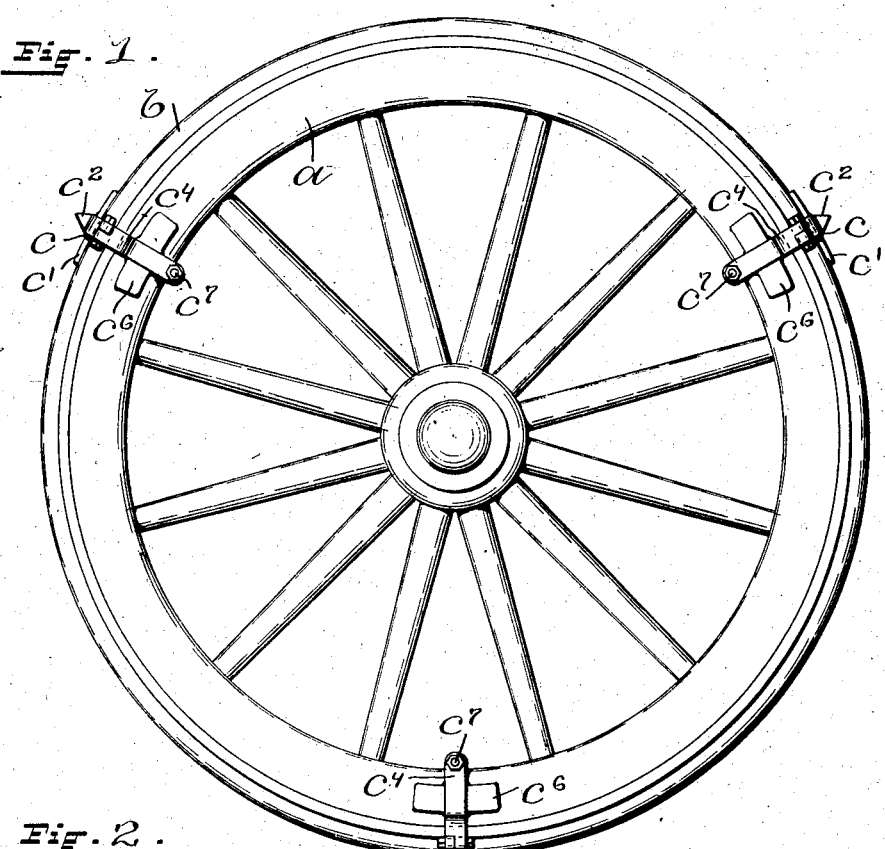
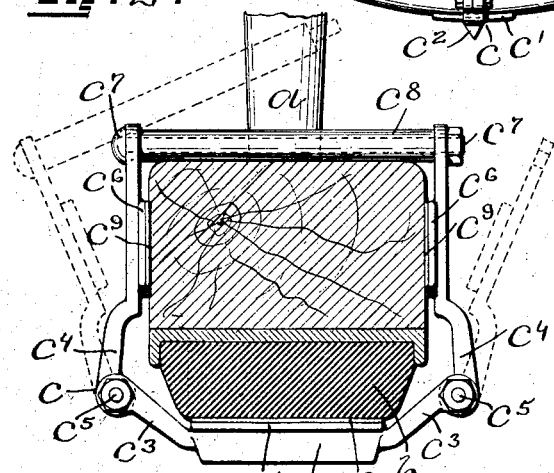
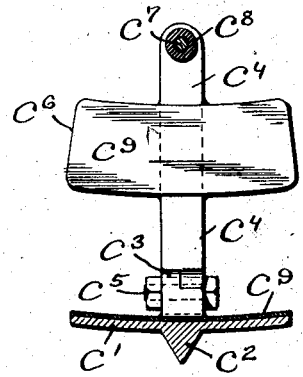
WITNESSES:
Ada E. Fagerty.
Chas. H. Luther Jr.
INVENTOR:
William Cleeland
by Joseph H. Miller & Co.
ATTORNEYS.

No. 760,731.

Patented May 24, 1904.

UNITED STATES PATENT OFFICE.

WILLIAM CLEELAND, OF PROVIDENCE, RHODE ISLAND.

SHOE ATTACHMENT FOR VEHICLE-WHEELS.

SPECIFICATION forming part of Letters Patent No. 760,731, dated May 24, 1904.

Application filed February 19, 1904. Serial No. 194,312. (No model.)

*To all whom it may concern:*

Be it known that I, WILLIAM CLEELAND, a citizen of the United States, residing at Providence, in the county of Providence and State of Rhode Island, have invented a new and useful Improvement in Shoe Attachments for Vehicle-Wheels, of which the following is a specification.

This invention has reference to an improvement in non-slipping shoe attachments for power-driven vehicle-wheels, such as the driving-wheels of automobiles having solid-rubber or pnuematic tires, said non-slipping shoe attachments being adapted to improve the traction of the driving-wheels when used under adverse conditions.

In the use of automobiles, and particularly heavy autotrucks, in winter, when there is more or less ice, snow, or slush on the ground, it has been found that the traction of the driving-wheels is insufficient. The smooth surface of the rubber tires slipping and sliding under such conditions gives inadequate traction to the machine, particularly when starting the machine. This difficulty has been partly overcome by the use of a rope wound spirally around the tire and wheel-rim, forming a device that is crude in conception, expensive to maintain, and difficult to apply or remove.

The object of my invention is to improve the traction of power-driven vehicle-wheels when used under adverse conditions, and I accomplish this object by attaching to the tire and wheel-rim a plurality of metal shoes having calks or ribs adapted to extend across the tread of the tire.

A further object of my invention is to construct a non-slipping metal shoe attachment so that the shoe may be easily and quickly attached or detached from the tire and wheel-rim.

My invention consists in the peculiar and novel construction of a non-slipping shoe attachment for power-driven vehicle-wheels, said attachment having a shoe shaped to conform to the tread of the tire, a calk or V-shaped rib on the bottom of the shoe, supports extending outward from the sides of the shoe, arms pivotally secured to the supports, plates on the arms bearing on the sides of the wheel-rim, and a bolt extending through the free ends of the arms over the rim for securing the whole to the tire and wheel-rim, as will be more fully set forth hereinafter.

Figure 1 is a side view of a power-driven vehicle-wheel having a solid-rubber tire and showing a plurality of my improved non-slipping shoe attachments secured to the tire and wheel-rim. Fig. 2 is an enlarged sectional view through the tire and wheel-rim, showing the shoe attachment secured to the tire and wheel-rim in full lines and the manner of releasing the shoe attachment in broken lines; and Fig. 3 is a vertical sectional view taken centrally through the shoe attachment.

In the drawings, $a$ indicates the driving-wheel of a heavy autotruck, $b$ the solid-rubber tire secured to the wheel in any well-known way, and $c$ my improved non-slipping shoe attachment. The shoe attachment consists of the metal plate $c'$, forming a shoe shaped to conform to the tread of the tire and having the transverse V-shaped calk $c^2$ on the outside, the outwardly-extending supports $c^3$ $c^3$ on the sides of the shoe, the arms $c^4$ $c^4$, pivotally secured to the supports $c^3$ $c^3$ by the bolts $c^5$ $c^5$, the plates $c^6$ $c^6$ on the arms $c^4$ $c^4$, bearing on the sides of the wheel-rim, and the bolt $c^7$, extending through holes in the free ends of the arms $c^4$ $c^4$ and covered with the rubber tubing $c^8$, bears on the inner face of the wheel-rim.

To prevent abrasion and to more firmly hold the shoe attachment on the tire and rim, I cover the inner surfaces of the plates $c'$ and $c^6$ $c^6$ with the sheet-rubber $c^9$ $c^9$, as shown in Figs. 2 and 3.

My improved non-slipping metal shoe attachment is quickly and firmly secured to the tire and rim by placing the plate $c'$, forming the shoe, on the tread of the tire, with the tire and rim between the arms $c^4$ $c^4$. The screw-threaded end of the bolt $c^7$ is now passed over the inner face of the rim and through a hole in the free end of the adjacent arm $c^4$ and secured by a nut, as shown in Fig. 2. To release the shoe attachment from the tire and rim, it is only necessary to remove the nut on the bolt $c^7$, when the attachment is instantly released.

It is evident that the construction of the shoe attachment could be varied or changed to fit any kind of rim or tire and that any form of calks could be used on the shoe—such as spurs, spikes, teeth, or corrugations—without materially affecting the spirit of my invention.

Having thus described my invention, I claim as new and desire to secure by Letters Patent—

1. A shoe attachment for vehicle-wheels, having a metal shoe shaped to conform to the tread of the tire, supports on the shoe, arms pivotally secured to the supports, and a bolt passing through holes in the free ends of the arms for detachably securing the shoe to the tire and wheel-rim, as described.

2. A shoe attachment for vehicle-wheels, having a metal plate forming the shoe shaped to conform to the tread of the tire, supports on the shoe, arms pivotally secured to the supports, plates on the arms adapted to bear on the sides of the wheel-rim, and a bolt passing through holes in the free ends of the arms for detachably securing the shoe to the tire, as described.

3. The combination with a wheel rim and tire, of a metal shoe attachment having a shoe shaped to conform to the tread of the tire, supports on the shoe, arms pivotally secured to the supports, plates on the arms adapted to bear on the sides of the wheel-rim, a bolt passing through holes in the free ends of the arms and over the inner face of the wheel-rim, a rubber tube inclosing the bolt, and non-abrasive material secured to the inner surfaces of the shoe and the plates, as described.

4. In combination, the metal shoe attachment $c$ having the plate $c'$ forming the shoe, the calk $c^2$ on the shoe, the supports $c^3 c^3$ on the shoe, the arms $c^4 c^4$, the bolts $c^5 c^5$, the plates $c^6 c^6$ on the arms, the bolt $c^7$ extending through holes in the free ends of the arms, the rubber tubing $c^8$ on the bolt $c^7$, and the non-abrasive material $c^9 c^9$ on the plates $c'$ and $c^6 c^6$, all for the purpose as described.

In testimony whereof I have signed my name to this specification in the presence of two subscribing witnesses.

WILLIAM CLEELAND.

Witnesses:
ADA E. HAGERTY,
J. A. MILLER, Jr.